May 26, 1942.   C. BREER ET AL   2,284,123

FLUID COUPLING

Filed April 25, 1941   2 Sheets-Sheet 1

INVENTORS.
Carl Breer,
Gordon R. Pennington.
BY
*Harness, Dick, Patee & Harris*
ATTORNEYS.

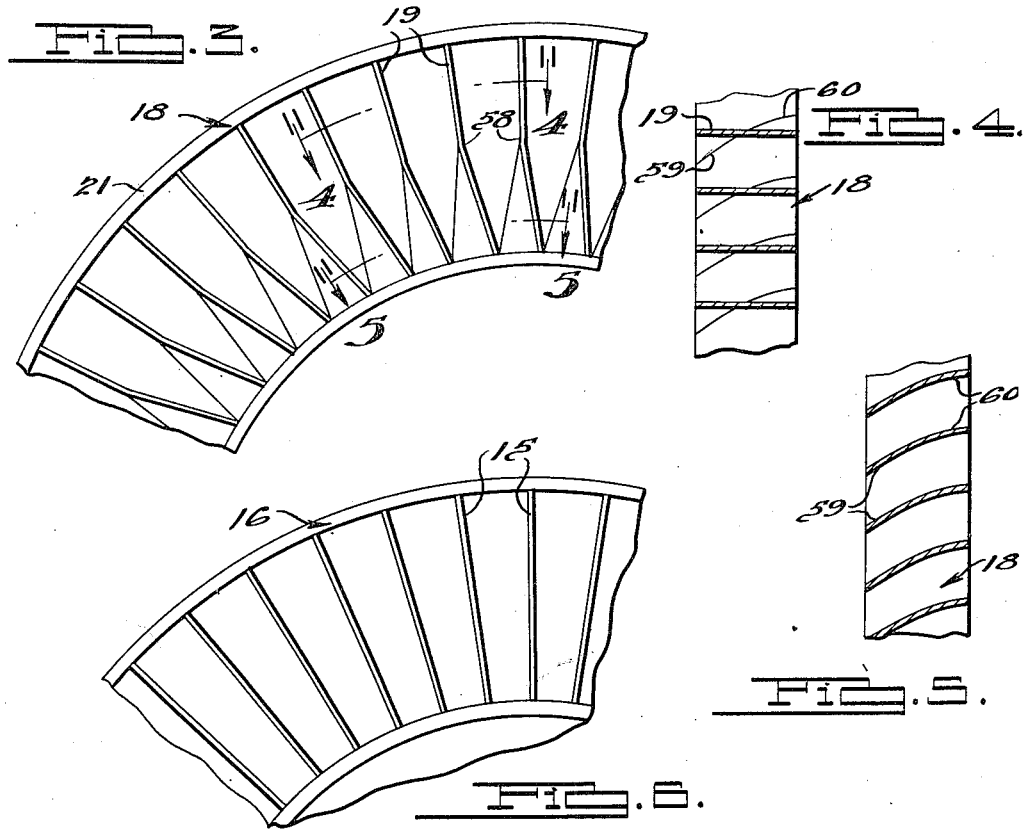
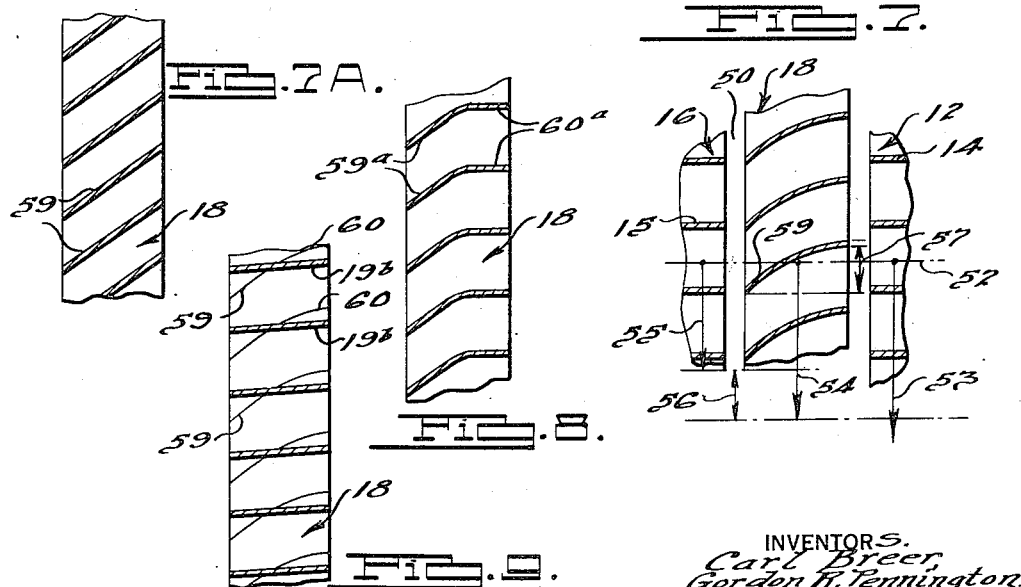

Patented May 26, 1942

2,284,123

UNITED STATES PATENT OFFICE 2,284,123

FLUID COUPLING

Carl Breer, Grosse Pointe, and Gordon R. Pennington, Bloomfield Hills, Mich., assignors to Chrysler Corporation, Highland Park, Mich., a corporation of Delaware Application April 25, 1941, Serial No. 390,302

20 Claims. (Cl. 74—189.5)

This invention relates to power transmission for use with motor vehicles or other machines or devices where it is desired to provide a cushioned drive or a transmission of power under varying torque converting conditions.

It is an objection of our invention to provide a power transmission embodying a multiple-stage fluid drive of improved characteristics and efficiency of operation.

Another object is to provide an improved fluid coupling of the type embodying an impeller structure and a plurality of runner structures, the runner structures automatically operating successively to impart drive to the vehicle as the vehicle or other load comes up to predetermined speed. Fluid couplings of such type may be termed multiple-stage couplings as distinguished from the more common type of coupling wherein the fluid circuit operates between an impeller and a single runner.

A further object of our invention is to provide improved operating efficiency in multiple-stage couplings especially when operating above the torque multiplying or converting range when it is desired to provide a minimum of slip between the impeller and the plurality of runners.

Further objects and advantages of our invention reside in the novel construction and relationship of parts more particularly hereinafter set forth, reference being had to the accompanying drawings in which:

Fig. 3 is a detail view of a portion of the primary runner structure taken as indicated by line 3—3 of Fig. 2.

Fig. 4 is a detail sectional view through typical vanes of the Fig. 3 runner, the view being taken as indicated by line 4—4 of Fig. 3.

Fig. 5 is a detail sectional view through other portions of the vanes shown in Figs. 3 and 4, the view being taken as indicated by line 5—5 of Fig. 3.

Fig. 6 is an elevational view of a portion of the secondary runner structure taken according to line 6—6 of Fig. 2.

Fig. 7 is a diagrammatic view of velocity vectors for the coupling members, the view being taken as indicated by line 7—7 of Fig. 2.

Fig. 7A is a view similar to Fig. 5 but illustrating a modified vane formation.

Fig. 8 is a view corresponding to Fig. 5 but illustrating a modified vane formation.

Fig. 9 is a view corresponding to Fig. 4 but illustrating a further modified vane formation.

Figure 1:
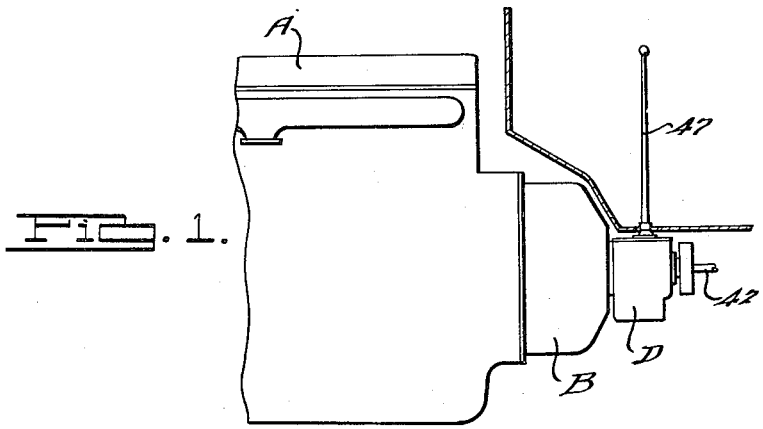
Fig. 1 is an elevational view showing our power transmission arranged for driving a motor vehicle.

Referring to the drawings we have illustrated our power transmission in connection with a motor vehicle drive wherein A represents the usual engine, B the casing for fluid coupling C, and D a transmission of any desired type.

Secured to the rear end of the engine crankshaft 10 is the flywheel shrouding 11 which extends rearwardly to carry the impeller structure 12 which is of hemi-torus formation. This impeller or driving member 12 of the fluid coupling comprises the annular dish-shaped housing 13 opening axially forwardly and having a plurality of radially extending circumferentially spaced vanes 14 preferably of non-curving or planar formation similar to the vanes 15 of the secondary runner structure 16 as shown in Fig. 6.

The secondary runner 16 has its dish-shaped hemitorus housing 17 forwardly closed so as to be open axially rearwardly facing the open portion of impeller 12. Disposed intermediate the impeller 12 and runner 16 is a primary runner structure 18 having its vanes 19 arranged in circumferentially spaced relationship and disposed generally radially between inner and outer cylindrical housings 20 and 21 respectively. The vane passages of runner 18 are axially open to the vane passages of impeller 12 and runner 16 and, according to known practice, the vanes may differ in number in the component impeller and runner structures for elimination of hydraulic pulsations. Any desired number of primary runners may be interposed between impeller 12 and runner 16 for connection through suitable gearing according to the showing in the patent to H. F. Patterson No. 2,203,177 of June 4, 1940.

In order to illustrate the principles of operation of our coupling we have shown runner 16 connected to a hub 22 mounted on driven shaft 23 and journalled by ball bearing 24 in the structural extension 25 of crankshaft 10, this extension mounting the shrouding 11.

Runner 18 is connected to a hub 26 having a sleeve portion 26ª journalled by anti-friction bearings 27, 28 on shaft 23 and carrying a sun gear 29 meshing with the large planetary pinion 30. This pinion has formed therewith a smaller pinion 31 meshing with a sun gear 32 larger than sun gear 29 and fixed to shaft 23. The carrier 33 for the compound planet pinions 30, 31 has a rear cylinder portion 34 journalled by ball bearing 35 on shaft 23 and formed with the usual cam faces for coaction with one-way brake rollers 36 disposed within cylindrical portion 37 of fixed housing B. The one-way brake E is so arranged as to allow carrier 33 to rotate freely forwardly in the direction of rotation of crank-shaft 10 but to prevent rotation of the carrier in the opposite direction.

Shaft 23 is journalled by a ball bearing 38 carried by the forward end of transmission D and has a pinion 39 meshing with countershaft gear 40 formed with a cluster gear 41. The output shaft 42, which transmits drive to the usual rear ground wheels of the vehicle, has splined connection with a gear 43 formed with clutch teeth 44 engageable with teeth 45 of pinion 39. A reverse idler gear 46 is in constant mesh with gear 41. A suitable shift mechanism 47 is provided to shift gear 43 from its illustrated position either forwardly to clutch teeth 44 with teeth 45, or rearwardly to mesh gear 43 with reverse idler 46. In the one instance shaft 42 will be directly coupled with shaft 23 and in the other instance shaft 42 will receive a reverse reduction drive from shaft 23.

The fluid coupling is partially filled, according to known practice, with suitable fluid such as coupling oil, seals 48, 49 being provided to prevent escape of the oil. The various vanes 14, 15, and 19 are preferably welded or hydrogen brazed with their respective carrying shells or housings 13, 17 and 20, 21. Before describing our novel formation of vanes 19 we will briefly describe the operation of the arrangement as thus far described.

For forward drive, gear 43 is shifted forwardly to clutch with teeth 45 and the engine A is speeded up in the usual manner thereby causing fluid in the coupling to be displaced at impeller 12 toward primary runner 18 adjacent the outer regions of their vane passages. Inasmuch as shaft 42 is under load, the secondary runner 16 tends to remain stationary and the fluid will, for the most part, set up a circulatory path as generally indicated at F—G. This circulation is facilitated by the arrangement of the vane passages of runner 18 which are radially freely open. Runner 18 therefore takes over the drive from impeller 12 and rotates forwardly at relatively slow but increasing speed, the slip between the impeller 12 and runner 18 being accommodated by the oil.

Forward rotation of runner 18 drives sun 29 and, as shaft 23 tends to remain stationary under its load, carrier 33 tends to rotate backwards causing brake E to hold the carrier with casing B. This compels shaft 23 to turn forwardly with torque multiplication at the train 29, 30, 31, 32, brake E taking the reaction. As the car is accelerated from rest, with accompanying increase in speed of runner 18 and runner 16, the circuit F—G enlarges so as to cause runner 16 to take over the drive. At such time the fluid circuit may be generally represented as F—H—J—K. The transition is of course of a gradual nature. When runner 18 is the principal driving element, then runner 16 idles around and assumes more and more of the drive as the car is accelerated from rest. Then when runner 16 is the principal driving element, runner 18 idles around and brake E releases to permit carrier 33 to rotate forwardly with only slight slip between shaft 23 and sleeve 26ª. After the torque multiplying range has been passed, the coupling structures 12, 18, 16 should desirably perform much as an ordinary two-part fluid coupling of the type having an impeller and juxtaposed runner but the presence of the runner 18 in the type of coupling illustrated introduces certain disadvantages and inefficiencies which are largely overcome by our invention. The condition of drive through the coupling above the torque multiplying range may be referred to as the "locked" condition of the coupling during the vehicle cruising range although it will be understood that there will always be a hydraulic slip between impeller 12 and runner 18 and also between runner 18 and runner 16.

During the locked condition, runner 16 rotates slower than runner 18, the latter rotating slower than impeller 12. Therefore the oil returning from runner 16 to runner 18 along the inner part of circuit F—H—J—K would tend to slow down or impede rotation of runner 18 against its rotational tendency by reason of the oil forced from impeller 12 to runner 18 along the outer part of this circuit. During the locked condition a certain amount of the oil travels radially inwardly of the passages formed by vanes 19, as indicated at circuit portion G, and this flow accelerates runner 18 because the tangential velocity of the oil has to slow down, the difference being imparted as energy to runner 18.

It will be apparent that, from a standpoint of energy balance, the fluid energy at delivery or transfer zone 51 must equal the fluid energy at transfer or delivery zone 50 plus the fluid energy at the inward flow along vanes 19 as at G plus energy given up to runners 16 and 18. During cruising, any energy transferred to runner 18 at zones 50, 51 is lost because runner 18 is free at such time from drive connection with shaft 23. Therefore minimizing energy transferred at zone 50 from runner 16 to runner 18 will result in less energy loss and an increase in operating efficiency.

Inasmuch as runner 18 rotates faster than runner 16 during cruising or locked condition of drive, it will be apparent that the oil delivered at zone 50 to runner 18 will approach this runner at an angle with respect to a line 52 (Fig. 7) parallel to the axis of rotation of the coupling structures and extending through zone 50. Fig. 7 diagrammatically illustrates portions of the coupling elements at zone 50 during cruising conditions. At this time the tangential velocities of the members 12, 18 and 16 may be vectorially represented at 53, 54 and 55 assuming about ½ of 1% slip between members 12 and 18 and something of the order of 2 to 3% slip between members 16 and 18. The latter slip is represented by the vector difference 56 and we therefore incline the portions of vanes 19 adjacent zone 50 so that the angle of approach of these vane portions with respect to line 52 is substantially equal to the travel of the fluid at zone 50 thereby to compensate for the difference in speeds of members 18 and 16 so that the fluid will enter the vane passages of runner 18 with a minimum of disturbance of the fluid flow and with a minimum of circumferential impact on vanes 19 and so that the fluid in travelling through runner 18 will be allowed to follow its natural directional flow with a minimum of disturbance, the outer ends of vanes 19 being planar and radial as seen in Fig. 4. Actually, because of unavoidable hydraulic losses, the effect of the fluid travel relative to speed difference 56 will be somewhat less than this vector difference and may be represented at 51 which distance determines the amount of warping of the inner ends of vanes 19 adjacent zone 50.

In practice the vanes 19 are progressively warped starting from about midway of their radial lengths at region 58 so that at approximately the region of maximum fluid flow at zone 50 the vanes 19 have inclined approach portions 59 lying generally in a direction so as not to interfere with the natural flow direction of fluid from runner 16. We find that the approach portions, if inclined about 35°, will provide good results in keeping with the desired objects. If desired, these inner warped vane portions may have a continuous constant angle of around 35° with respect to line 52 as shown in Fig. 7A but in order to impart greater rigidity to the runner 18, and for other reasons herein set forth, the discharge portions of the warped vane portions may have a different inclination from the approach portions 59 as shown in Figs. 5 and 7 or they may be parallel to line 52 as in Fig. 8.

As there is less speed difference between runner 18 and impeller 12, represented by the difference in vectors 53 and 54, the corresponding directional oil travel at zone 58 will be at an angle less than at zone 50. Therefore the discharge end portions of vane portions 59 are formed at 60 of less axial angularity than at 59 so as to cause the fluid to leave the runner 18 at zone 58 at approximately the angle for admission to the vane passages of impeller 12 with a minimum of energy loss, the general angularity at 60 being about 10°.

In practice the inner portions of vanes 19 may be generally curved as in Fig. 5 so as to provide smooth fluid flow without abrupt change in direction and for minimizing hydraulic losses. However, if desired, the entrance portions may be formed flat at an angle of about 35° as at 59ᵃ in Fig. 8 and discharge portions 60ᵃ axial.

By reason of our invention the energy loss in the main circuit F—H—J—K during cruising or locked driving condition is minimized and the efficiency of the coupling increased. Furthermore, by imparting angularity to vanes 19 at their inner end portions, the runner 18 is thereby reinforced and made rigid especially with respect to tendency of ring 20 to move circumferentially relative to ring 21 because of the oil flow and inertia effects of these rings.

For reverse drive, the gear 43 is shifted rearwardly to mesh with idler 46. Coupling C functions just the same in driving the car in reverse as in the forward drive although ordinarily the reverse drive will be limited to the torque conversion range of operation unless the vehicle should be driven in reverse at a sufficiently high speed to cause the runner 16 to take over the major share of drive from runner 18.

During the torque conversion drive, fluid which extends beyond circuit F—G into runner 16 and circuit F—H—J—K will, of course, serve to drive runner 16 forwardly and thereby supplement the drive imparted by runner 18 through gearing 30, 31 to shaft 23. Under starting load circuit F—G will predominate over circuit F—H—J—K but as the speeds of runners 18 and 16 increases circuit F—H—J—K gradually becomes predominant over circuit F—G and eventually runner 16 takes over the full drive to shaft 23, a small quantity of fluid flowing in circuit F—G as aforesaid. The warping of vane 19, as at 59, 60, will not hinder radially inward flow of fluid in runner 18.

Our arrangement affords beneficial inflow action of the fluid in runners 18 and 16. The oil travelling radially inwardly in runner 19 during the torque multiplying operation accelerates runner 18 because of the increasing change in the tangential velocity of the oil thereby imparting energy to the runner 18. In addition, the impact of the oil transferred at 51 to runner 18 also serves to supplement the drive of this runner. While we have shown impeller 12 and runner 16 free from the customary torus ring at the central zone of oil circulation, this is not as important as maintaining runner 18 free for oil travel radially inwardly so as to allow the inflow action of the oil to take place.

Referring to Fig. 9 we have illustrated a modification of the arrangement in Figs. 3 and 4 wherein the vanes 19ᵇ are warped below zone 58 just as in Figs. 3 and 4 but above zone 58 these vanes are now disposed at a slight angle of approximately 5° to the axis. For general convenience of manufacture the upper angled portions of the vanes 19ᵇ above zone 58 are planar as in Fig. 3, also for the reason that curving or warping the vanes at these upper portions would not make much appreciable difference over planar formation.

When the coupling is operating above the torque conversion range then, if runner 18 idles around at the same speed as that of impeller 12, there would be no circulation of the oil inwardly of runner 18 and the oil would circulate in path F—H—J—K. It is because of any difference in speed between structures 12 and 18 that the oil circulates to some extent in path F—G tending to bring runner 18 up to the speed of the impeller 12. However if the warped curved portions 59, 60 are properly designed then the relative rotation between members 12 and 18 becomes so slight that, for practical purposes, the outer portions of the vanes 19 may be arranged planar and parallel to the axis as in Figs. 3 and 4. However, if it is desired to introduce a further refinement, especially where runner 18 tends to lag impeller 12 under the assumed conditions, then the efficiency of the coupling may be further increased by disposing the outer portions of the vanes of runner 18 at a slight angle such as around 5° with the axis. The direction of inclination is the same as that at 59, 60 but not so great in extent because there will be a much greater difference in speed between members 16 and 18 than between members 12 and 18.

In each of Figs. 5, 7A, 8 and 9 the inner portions of the vanes of runner 18 are of warped formation. In Figs. 5 and 9 they are also inclined with the axis and also curved in the axial direction. In Fig. 8 the warped vane surfaces are inclined at their entrance portions 59ᵃ and straight or parallel with the axis at their discharge portions 60ᵃ. In Fig. 9 the outer end portions of these vanes are planar and slightly angled with respect to the axis.

The direction of inclination of the outer end portions of vanes 19ᵇ is the same as at the inner end portions of these vanes owing to the circumstance that the runner 18 tends to lag slightly behind impeller 12 above the torque converting range and such inclination will least interfere with the natural directional flow at zone 51 without impact along vanes 19ᵃ.

Figure 2:
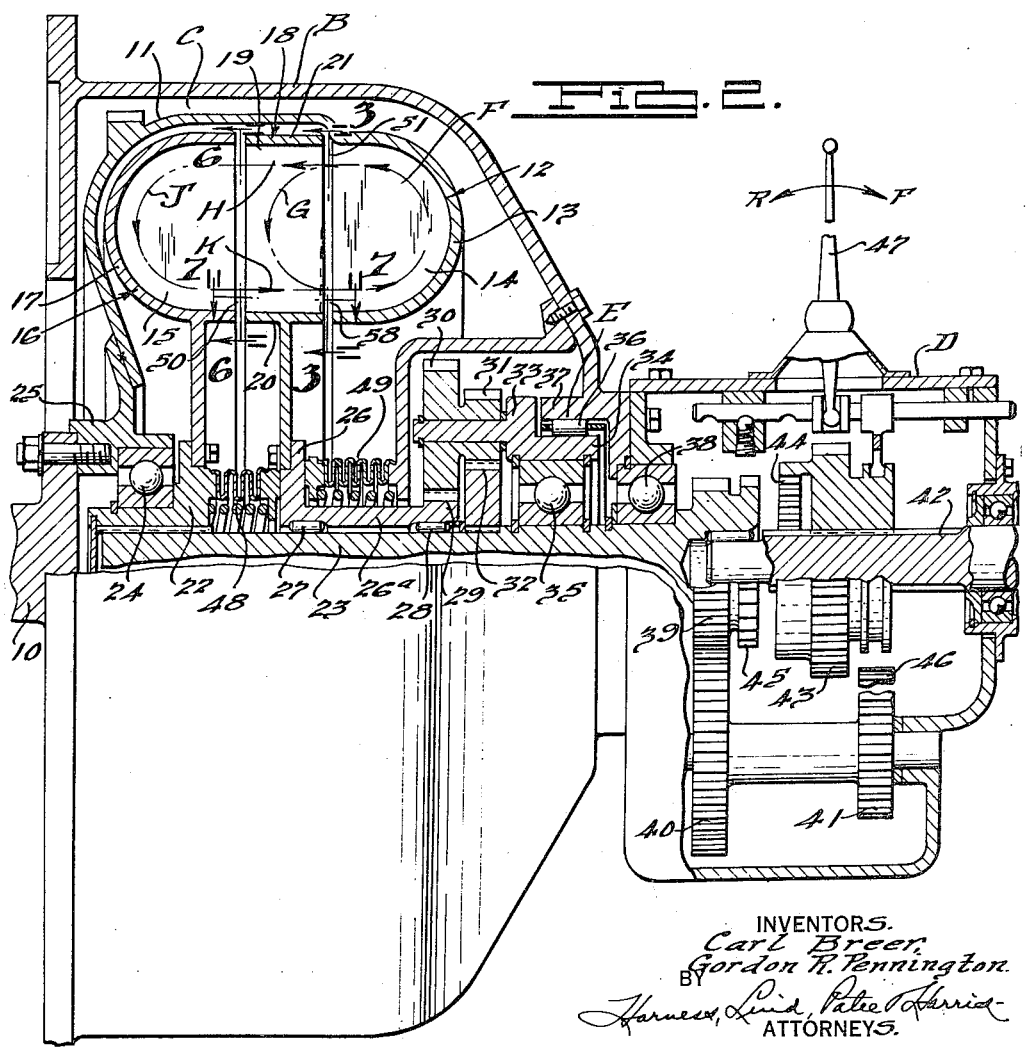
Fig. 2 is a sectional elevational view through the fluid coupling and gearing.

In each of Figs. 5, 7A, 8 and 9 it may be said that the inner portions of the vanes of runner 18 are inclined with respect to lines parallel to the axis of rotation of members 12, 16, 18 at the zone 50 of returning fluid flow in circuit F—H—J—K. In Figs. 5 and 9 this inclination is of changing or curving formation at 59, 60. In defining the circuits F—H—J—K and F—G according to the directional arrows in Fig. 2, it is of course assumed that the system is operating for normal drive of the vehicle by the engine as, during coast, the secondary runner 16 becomes the driver or impeller causing the oil to reverse its direction of flow.

The warped relationship of the inner end portions of the vanes of runner 18 is such that these portions are displaced about the general longitudinal or radial axis of these vanes relative to the outer end portions of the vanes.

We claim:

1. In a power transmission; a power input shaft adapted to deliver power during rotation thereof in a given direction; a driven output shaft; a multi-stage fluid coupling for transmitting drive from said driving shaft to said driven shaft; said coupling comprising a vaned impeller adapted to receive drive from said driving shaft, a vaned secondary runner adapted to transmit drive to said driven shaft, and a vaned primary runner; said impeller and runners being disposed for rotation about a common axis and said primary runner being disposed axially between said impeller and said secondary runner such that fluid in said coupling will flow in a circuit from said impeller through said primary runner to said secondary runner and thence returning through said primary runner to said impeller; said primary runner having a plurality of vanes extending outwardly from said axis and defining passages accommodating flow of said fluid in said circuit and also in a second circuit from said impeller to said primary runner and thence inwardly along said vane passages for return to said impeller; means providing a releasable driving connection between said primary runner and said driven shaft for multiplying torque between said primary runner and said driven shaft during fluid flow in said second circuit thereby providing one stage of operation of said coupling, said releasable driving connecting means operating automatically to release said primary runner from driving connection with said driven shaft during fluid flow in the first said circuit to allow said secondary runner to drive said driven shaft independently of said primary runner and to allow said primary runner to coast around with said impeller thereby providing another stage of operation of said coupling; said vanes of said primary runner having inner portions thereof warped with respect to outer portions thereof to dispose said inner portions angularly with respect to lines parallel to said axis at the zone of returning fluid flowing in the first said circuit from said secondary runner to said primary runner, the inclination of said vane inner portions adjacent said zone being such that the fluid from said secondary runner will enter the vane portions of said primary runner with minimized disturbance of the fluid flow and with minimized circumferential impact of the fluid on the vanes of said primary runner when said coupling is operating in its said another stage.

2. In a power transmission; a power input shaft adapted to deliver power during rotation thereof in a given direction; a driven output shaft; a multi-stage fluid coupling for transmitting drive from said driving shaft to said driven shaft; said coupling comprising a vaned impeller adapted to receive drive from said driving shaft, a vaned secondary runner adapted to transmit drive to said driven shaft, and a vaned primary runner; said impeller and runners being disposed for rotation about a common axis and said primary runner being disposed axially between said impeller and said secondary runner such that fluid in said coupling will flow in a circuit from said impeller through said primary runner to said secondary runner and thence returning through said primary runner to said impeller; said primary runner having a plurality of vanes extending outwardly from said axis and defining passages accommodating flow of said fluid in said circuit and also in a second circuit from said impeller to said primary runner and thence inwardly along said vane passages for return to said impeller; means providing a releasable driving connection between said primary runner and said driven shaft for multiplying torque between said primary runner and said driven shaft during fluid flow in said second circuit thereby providing one stage of operation of said coupling, said releasable driving connecting means operating automatically to release said primary runner from driving connection with said driven shaft during fluid flow in the first said circuit to allow said secondary runner to drive said driven shaft independently of said primary runner and to allow said primary runner to coast around with said impeller thereby providing another stage of operation of said coupling; said vanes of said primary runner having fluid-receiving inner portions thereof disposed angularly with respect to lines parallel to said axis at the zone of returning fluid flowing in the first said circuit from said secondary runner to said primary runner, the inclination of said vane inner portions adjacent said zone being such that the fluid from said secondary runner will enter the vane portions of said primary runner with minimized disturbance of the fluid flow and with minimized circumferential impact of the fluid on the vanes of said primary runner when said coupling is operating in its said another stage.

3. In a power transmission according to claim 2; the inclination of said vane inner portions adjacent said zone being in excess of approximately 30° with respect to said parallel lines.

4. In a power transmission according to claim 2; portions of said vane inner portions in the region of fluid discharged therefrom in the first said circuit being disposed at an inclination with respect to said parallel lines, this inclination being less than that of said vane inner portions adjacent said zone.

5. In a power transmission according to claim 1; portions of said vane warped inner portions disposed in the region of fluid discharged therefrom in the first said circuit being disposed at an inclination with respect to said parallel lines, this inclination being less than that of said vane inner portions adjacent said zone.

6. In a power transmission according to claim 2; portions of said vane inner portions in the region of fluid discharged therefrom in the first said circuit being disposed at an inclination of approximately 10° with respect to said parallel lines.

7. In a power transmission according to claim 2; portions of said vane inner portions in the region of fluid discharged therefrom in the first said circuit being disposed at an inclination with respect to said parallel lines, this inclination being in the same general direction but less than that of said vane inner portions adjacent said zone.

8. In a power transmission according to claim 2; portions of said vane inner portions in the region of fluid discharged therefrom in the first said circuit being disposed approximately parallel with said parallel lines.

9. In a power transmission according to claim 1; portions of said vane warped inner portions disposed in the region of fluid discharged therefrom in the first said circuit being disposed approximately parallel with said parallel lines.

10. In a power transmission according to claim 1; said outer portions of the vanes of said primary runner being substantially planar.

11. In a power transmission according to claim 2; said vanes of said primary runner having outer substantially planar portions thereof disposed in the first said circuit.

12. In a power transmission according to claim 1; said outer portions of the vanes of said primary runner having fluid-receiving portions thereof inclined with respect to lines parallel to said axis at the zone of fluid flowing from said impeller in the first said circuit.

13. In a power transmission according to claim 2; said vanes of said primary runner having outer fluid-receiving portions thereof inclined with respect to lines parallel to said axis at the zone of fluid flowing from said impeller in the first said circuit.

14. In a power transmission according to claim 2; the vanes of said impeller and secondary runner being substantially planar.

15. In a power transmission according to claim 1; the vanes of said impeller and secondary runner being substantially planar.

16. In a fluid coupling; vaned co-axial relatively rotatable impeller and runner members of approximately hemitoroidal formation; an intermediate vaned runner structure rotatable about said axis relatively to each of said members and disposed axially therebetween; the vanes of said intermediate runner structure being disposed to form passages therebetween open toward said members and extending generally outwardly with respect to said axis so as to accommodate fluid flow between said members by passage of the fluid through said intermediate runner structure at inner and outer regions respectively adjacent inner and outer ends of said passages and to accommodate fluid flow inwardly within said intermediate runner structure between said outer and inner regions, the vanes of said intermediate runner structure having portions adjacent said inner regions warped with respect to portions thereof adjacent said outer regions.

17. In a fluid coupling; vaned co-axial relatively rotatable impeller and runner members of approximately hemitoroidal formation; an intermediate vaned runner structure rotatable about said axis relatively to each of said members and disposed axially therebetween; the vanes of said intermediate runner structure being disposed to form passages therebetween open toward said members and extending generally outwardly with respect to said axis so as to accommodate fluid flow between said members by passage of the fluid through said intermediate runner structure at inner and outer regions respectively adjacent inner and outer ends of said passages and to accommodate fluid flow inwardly within said intermediate runner structure between said outer and inner regions, the vanes of said intermediate runner structure having portions thereof adjacent said inner regions disposed angularly with respect to lines parallel to said axis at the zone of fluid flowing from said runner member toward said intermediate runner structure.

18. In a fluid coupling; vaned co-axial relatively rotatable impeller and runner members of approximately hemitoroidal formation; an intermediate vaned runner structure rotatable about said axis relatively to each of said members and disposed axially therebetween; the vanes of said intermediate runner structure being disposed to form passages therebetween open toward said members and extending generally outwardly with respect to said axis so as to accommodate fluid flow between said members by passage of the fluid through said intermediate runner structure at inner and outer regions respectively adjacent inner and outer ends of said passages and to accommodate fluid flow inwardly within said intermediate runner structure between said outer and inner regions, the vanes of said intermediate runner structure having portions thereof adjacent said inner regions disposed angularly with respect to lines parallel to said axis at the zone of fluid flowing from said runner member toward said intermediate runner structure, the inclination of said angularly disposed vane portions being less adjacent the extremities thereof which discharge fluid from said passages toward said impeller member at said inner regions than adjacent the extremities thereof which admit fluid to said passages from said runner member at said inner regions.

19. In a fluid coupling; vaned co-axial relatively rotatable impeller and runner members of approximately hemitoroidal formation; an intermediate vaned runner structure rotatable about said axis relatively to each of said members and disposed axially therebetween; the vanes of said intermediate runner structure being disposed to form passages therebetween open toward said members and extending generally outwardly with respect to said axis so as to accommodate fluid flow between said members by passage of the fluid through said intermediate runner structure at inner and outer regions respectively adjacent inner and outer ends of said passages and to accommodate fluid flow inwardly within said intermediate runner structure between said outer and inner regions, the vanes of said intermediate runner structure having portions thereof adjacent said inner regions warped in relation to portions of these vanes adjacent said outer regions and in relation to lines parallel to said axis at the zone of fluid flowing from said runner member toward said intermediate runner structure.

20. In a fluid coupling; a runner structure mounted for rotation about an axis and comprising a pair of rings arranged one within the other; a plurality of circumferentially spaced vanes extending between said rings to define a plurality of passages accommodating fluid flow through the runner structure adjacent each of said rings and also inwardly within the runner structure from said outer ring to said inner ring; said vanes having inner portions thereof warped with respect to outer portions thereof.

CARL BREER.
GORDON R. PENNINGTON.